US007181173B1

(12) United States Patent
Daly et al.

(10) Patent No.: US 7,181,173 B1
(45) **Date of Patent: *Feb. 20, 2007**

(54) ELECTRICAL TRANSCEIVER MODULE WITH ALTERNATE PERIPHERAL DEVICE CONNECTOR

(75) Inventors: John J. Daly, Chicago, IL (US); Robert V. Skepnek, Norridge, IL (US); Alex Pirillis, Skokie, IL (US)

(73) Assignee: Methode Electronics, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/087,979

(22) Filed: Mar. 23, 2005

Related U.S. Application Data

(63) Continuation of application No. 10/133,173, filed on Apr. 26, 2002, now Pat. No. 6,876,838.

(51) Int. Cl.
*H04B 1/38* (2006.01)

(52) U.S. Cl. ................... 455/90.3; 455/90.1; 455/90.2; 455/556.1; 455/557; 455/575.1; 455/300; 455/575.6; 379/429; 379/428.02; 379/447; 379/433.05; 379/433.13

(58) Field of Classification Search ............... 455/90.3, 455/90.1, 556, 557, 575.1, 575.6, 300; 379/429, 379/428.02, 447

See application file for complete search history.

(56) References Cited

U.S. PATENT DOCUMENTS

| | | | | |
|---|---|---|---|---|
| 5,651,701 | A * | 7/1997 | Chen | 439/607 |
| 5,736,782 | A * | 4/1998 | Schairer | 257/679 |
| 6,072,803 | A * | 6/2000 | Allmond et al. | 370/445 |
| 6,118,434 | A * | 9/2000 | Nishitani et al. | 345/173 |
| 6,304,436 | B1 * | 10/2001 | Branch et al. | 361/683 |
| 6,482,017 | B1 * | 11/2002 | Van Doorn | 439/89 |
| 6,556,446 | B1 * | 4/2003 | Hwang | 361/728 |
| 6,618,385 | B1 * | 9/2003 | Cousins | 370/401 |
| 6,721,872 | B1 * | 4/2004 | Dunlop et al. | 712/28 |
| 6,848,009 | B2 * | 1/2005 | Pascolini | 709/250 |
| 6,876,838 | B1 * | 4/2005 | Daly et al. | 455/90.3 |

OTHER PUBLICATIONS

Finisar Product Specification FCM-8519-1-T4/ FCM-8519-2-T4 Copper GBIC Transceiver, pp. 1-9 (copyright) Finisar Corporation Mar. 10, 2000.

* cited by examiner

*Primary Examiner*—Marceau Milord
(74) *Attorney, Agent, or Firm*—Seyfarth Shaw LLP

(57) ABSTRACT

The present invention pertains to an electrical transceiver module having a peripheral device connector to receive copper plugs having a profile equal to or larger than the outer profile of the standard module housing profile. An embodiment of the invention provides an RJ-45 receptacle as the peripheral device connector of an SFP (Small Form Factor Pluggable) transceiver.

30 Claims, 2 Drawing Sheets

ELECTRICAL TRANSCEIVER MODULE WITH ALTERNATE PERIPHERAL DEVICE CONNECTOR

This application is a continuation of patent application Ser. No. 10/133,173 filed Apr. 26, 2002 now U.S. Pat. No. 6,876,838.

BACKGROUND

The present invention pertains to electrical transceiver modules and, in particular, modules having a small form factor main body to be received by a host device, but including an alternative peripheral device connector.

Small form factor transceiver modules are known for interconnecting peripheral devices such as copper cables to a host device such a router, switch, hub or computer. Due to the continuing demand for greater bandwidth, these host devices require more peripheral interconnects and more transceivers populated in smaller areas. This has led to new transceiver modules that have a small form factor or small footprint. For example, such devices such as the Small Form Factor Pluggable (SFP) transceiver under the Multi-Source Agreement (MSA) (SFF-80741 Rev. 1.0 May 12, 2001) specifies a module housing having a width of approximately 13.7 mm and a height of approximately 8.6 mm at the host interface end. Such a module has a specially formed host device connector that allows for the module to be pluggably inserted within the host device and which allows for the high speed transmission of signals between the host device and the transceiver module. However, due to the small envelope package size, the connector at the opposite end is limited to only certain very small type peripheral device connectors. For example, such modules have been made with an HSSDC-II connector at the peripheral device connector end. Due to the small size of an HSSDC-II connector plug, a corresponding receptacle may be fit within the small profile of a standard SFP module housing without modification.

However, there are desired other types of peripheral device connectors to be used with such small form factor transceiver modules. There are many electrical connector plugs and cables that would enhance the usefulness and compatibility of such transceiver modules if alternate peripheral device connectors were available such as RJ type plugs/jacks. Typically, such peripheral device connector plugs have a larger profile than the outer profile of the small form factor modules themselves. Therefore, in some cases adapters have been provided to be interposed between the small form factor transceiver module and the large peripheral connector plug to be connected thereto. However, such adapters add significantly to the cost of the overall system, take-up significant real estate at the panel opening of the host device and may be misplaced after initial usage.

There is desired a small form factor transceiver that has a peripheral device connector that can accept alternative peripheral connector plugs that may be equal to or larger than the size of the outer dimensions of a standard small form factor transceiver module. The present invention provides for such a peripheral device connector of a small form factor transceiver that allows for a multitude of other peripheral device plugs to be connected thereto. The present invention also provides for a quick and easily assembled package that uses inexpensive parts to provide the small form factor transceiver having an enlarged peripheral device connector.

SUMMARY

The present invention in an embodiment provides an electrical transceiver module comprising a housing having a first end, a second end and a main body portion therebetween having a first width and a first height. The transceiver module includes a printed circuit board mounted within the housing and having circuit traces and electrical components mounted to the printed circuit board. A host device connector is at the first end providing for the module to be pluggably connected. A base member is at the second end and may have a second width that is greater than the first width. A peripheral device connector is provided having a rectangular shaped connector housing and a receptacle opening formed by the connector housing. The receptacle opening at its broadest point has a third width that is substantially equal to or greater than the first width. The receptacle opening at its broadest point has a second height that is substantially equal to or greater than the first height. The peripheral device connector is mounted to the base member so that the connector housing and the base combine to provide an enlarged profile greater than the main body profile. The peripheral device connector has contacts protruding beyond the connector housing and electrically connected to the circuit traces of the printed circuit board.

The transceiver module may have the base member integrally formed with the housing. The transceiver module may have the base member enclosing a protruding portion of the printed circuit board that provides a mounting area for the peripheral device connector. The transceiver module may have the peripheral device connector including contact tails forming linear pins to be received in through holes of the printed circuit board. The transceiver module may have the peripheral device connector including contact tails that are formed at a right angle in order to provide connection to the circuit traces exposed at an edge of the printed circuit board. The transceiver module of may have the protruding portion including a flex circuit attached thereto. The flex circuit may include through holes for receiving the contacts of the peripheral device connector. The host device connector may be formed at least partially by an edge of the printed circuit board exposed at the first end. The printed circuit board may include contact fingers formed at the edge connected to the circuit traces of the printed circuit board. The host device connector may be formed to be compliant with SFP MSA specification. The host device connector may be provided by a connector that is separate from the module and is attached thereto at the first end.

In an alternate embodiment a transceiver module is provided comprising a housing having a first end and a second end and at its narrowest portion providing a first width. A host device connector is provided by the first end. A base member is provided at the second end having a second width greater than the first width. A peripheral device connector has a second width and is mounted to the base member. The peripheral device connector may include a connector housing forming a receptacle opening. The receptacle opening may be formed to receive an RJ-45 jack. The housing may include a printed circuit board extending from the first end to the second end and the peripheral device connector electrically connected to the printed circuit board at the second end.

In another alternate embodiment a small form factor transceiver module is provided comprising a main body having an outer profile and a frame forming a peripheral device connector having eight contacts exposed therein, the frame and contacts forming a receptacle for receiving an RJ-45 jack. The module may include a housing having a first end having a host device connector and a printed circuit board mounted within the housing and the peripheral device connector electrically connected to the printed circuit board. The module housing may include a base member protruding at the second end for mounting of the peripheral device connector thereto. The base member may enclose the printed circuit board to which the peripheral device connector is mounted. A connector housing of the peripheral device connector may have a first width greater than the outer profile of the main body and the first width approximately equal to a second width of the base member. A latch member is provided having an extended body that may be mounted to the base member.

BRIEF DESCRIPTION OF THE DRAWINGS

For the purpose of facilitating and understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF A PRESENTLY PREFERRED EMBODIMENT

Figure 1:
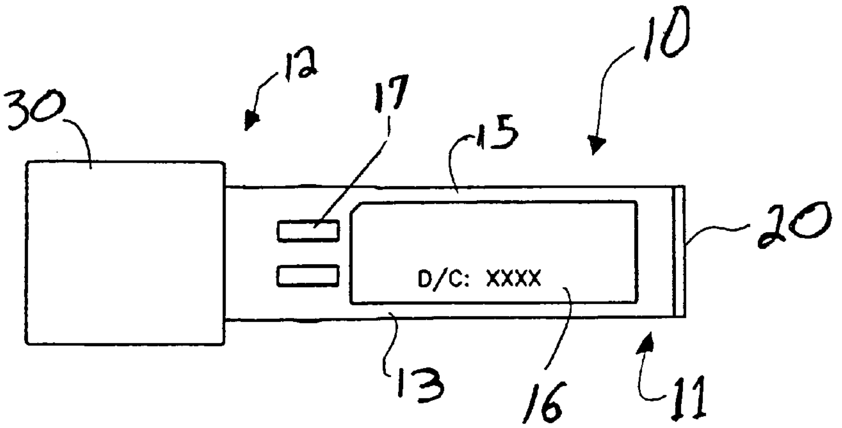
FIG. 1 is a plan view a small form factor transceiver with an enlarged peripheral device connector.

With reference to FIGS. 1–5, a presently preferred embodiment of the invention will be described. Drawing FIGS. 1–5 disclose only a preferred embodiment at the time of filing this application and the invention may encompass many other embodiments not disclosed in these drawings. Referring to FIG. 1, a plan view of a small form factor transceiver module 10 is shown. The transceiver module 10 includes a first end 11 and second end 12. At the first end 11 is a host device connector 20. At the second end 12 is a peripheral device connector 30. Located between the first end 11 and the second end 12 is a main body portion 13 of the module 10. In an embodiment, the main body 13 may be formed of a metallic member or cover 15. The metallic cover 15 may provide for EMI shielding of the module 10. Located on the cover 15 may be placed a label 16 which includes part numbers and other manufacturing information. In an embodiment, the cover 15 may have ground tabs 17 protruding therefrom and placed therein to aid in the EMI shielding of the module 10.

Figure 2:
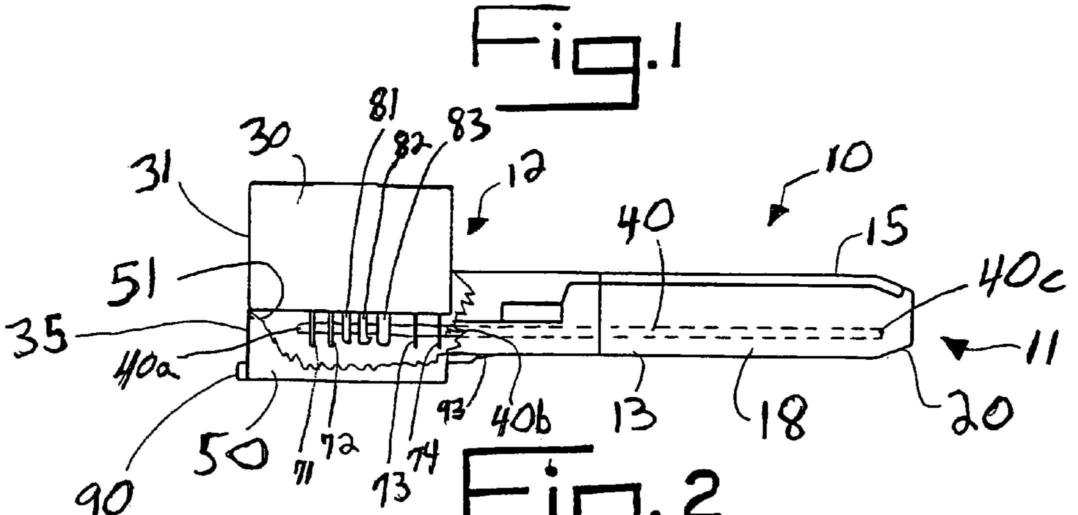
FIG. 2 is a side elevation of the transceiver module of FIG. 1 having a portion cut away to expose the mounting of the peripheral device connector to the printed circuit board.

Turning to FIG. 2, a side elevation of the module 10 is disclosed. At the first end 11 (shown in shadow) is printed circuit board 40 which is mounted within the housing 18 of the module 10. In an embodiment, the printed circuit board 40 may form the host device connector 20 at the first end 11, as will be discussed in further detail below. Metallic cover 15 is shown mounted onto housing 18. These two halves 15, 18 form a complete enclosure surrounding the printed circuit board 40 on four sides and the components mounted thereon.

The cover 15 and the housing 18 form the periphery of the main body portion 13 of the module 10. In a preferred embodiment, the dimensions of the main body portion are approximately 0.336 inches (x8.53 mm) by 0.528 inches (13.41 mm). Such dimensions comply with the SFP MSA (SFF-8074i Rev. 1.0) and allow for the main body portion 13 to be inserted in a standardized cage of a host device. Mounted on the printed circuit board 40 are components such as a driver, a termination circuit, a receiver, resistors and other known componentry which allow the module to act as an interface converter between a host device and a peripheral device. For example, such host devices as routers, hubs, servers and computers may receive the module 10. The host device may have a cage mounted therein in order to receive the module 10. The first end 11 is inserted within the cage so that the connector 20 may mate and interconnect the module to the host device. The second end 12 protrudes from the host device and the portion extending past the host device face plate or chassis opening may be enlarged.

At the second end 12 of the module 10 is the peripheral device connector 30. The peripheral device connector 30 is mounted to a base member 50. The base member 50 is integrally formed with the housing 18 and in a preferred embodiment is also formed of a metallic material. For example, the housing may be formed of stainless steel, zinc die cast with nickel plating over copper, machined aluminum or some metal injection molded material. In another embodiment, the housing may be formed of an injection molded plastic which may have a plating or metalization added to the outer surface in order to provide for a conductive surface. FIG. 2 discloses the base member 50 having an exposed section 51 where the outer wall of the base member 50 has been partially removed, in order to expose the printed circuit board second end 40*a*. The printed circuit board second end 40*a* is sectioned at point 40*b* so that the contacts 71, 72, 73 and 74 are exposed. The contacts 71, 72, 73 and 74 protrude from the base of the peripheral device connector 30. Also protruding from the base are mounting members 81, 82, 83. It can be seen that through holes are provided in the printed circuit board 40*a* which receive the contacts 71, 72, 73, 74 and the mounting members 81, 82, 83. Therefore, it may be understood that when a peripheral device is inserted in the receptacle opening 31 of the peripheral device connector 30 its electrical signals may be transmitted via the contacts 71, 72, 73 and 74 to the circuit traces of the printed circuit board 40 which are electrically connected with the components mounted on the printed circuit board which are, in turn, electrically connected to the host device via the host device connector 20 which is formed by the printed circuit board first end 40*c*.

The preferred embodiment of the invention disclosed in FIGS. 1–5 is oriented in order to accommodate a standard sized RJ-45 connector having standard pin-outs. The provision of the base member 50 and printed circuit board 40 having its second end 40*a* provided therein allow for quick and easy attachment of a standard RJ-45 connector. However, in order to reduce the profile of the peripheral device connector it may be modified. For example, the contacts 71, 72, 73 and 74 may be formed to provide a straddle mount or surface mount connection of the peripheral device connector 30 to the printed circuit board second end 40*a*. An another alternative is to provide a flex circuit attached to the second end 40*a* of the printed circuit board to provide connection to contacts of the connector 30 or directly provide an RJ-45 type connector receptacle. All such modifications may act to allow for the reorientation of the connector 30 in order to reduce the overall size of the outer dimensions or profile with respect to the module housing 18 profile. For example, reorienting contact tails 71, 72, 73 and 74 the overall height of the connector 30 might be reduced by lowering the bottom of the connector 30 below the standardized orientation of the printed circuit board. The base member 50 might also have a reduced profile to decrease the overhang of the width and height beyond the profile of the module main body 13. In another embodiment, modules may be provided that have a peripheral device connector with a first offset orientation and other modules having a peripheral device connector with a second offset orientation, so that multiple pairs of such modules can be stacked side by side in a host device on the same spacing of such modules that do not have enlarged peripheral device connectors taking up additional real estate at the host face plate/panel opening. In a further alternate embodiment, an RJ-45 type receptacle may be formed by eliminating the connector housing 34 and insulator 32 (FIG. 4) and merely providing a frame to support the contacts 37. In another alternative embodiment, the peripheral device connector of the present invention may also include a fiber optic receptacle for receiving a fiber optic plug such as an SC duplex type optical plug. Also disclosed in FIG. 2 is the latch member 90 which will be discussed in more detail below.

Figure 3:
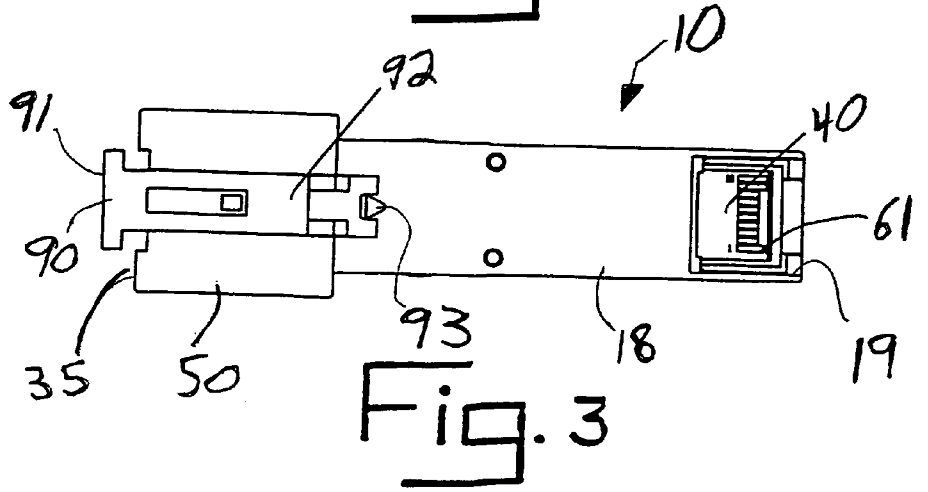
FIG. 3 is a bottom view of the transceiver module of FIG. 1.

Turning to FIG. 3, a bottom view of the module 10 is shown where the housing 18 has an opening 19 which exposes the printed circuit board 40 and shows the contact fingers 61 which are numbered 1–10. In an embodiment, ten contact fingers 61 are provided on the bottom of the board 40 as shown in FIG. 3 and ten contacts on the top of the board 40 (not shown) so that there are twenty contacts in total. As can be seen in FIG. 3, contacts 1, 9 and 10 are offset from the other contacts. In an embodiment, offset contacts are ground contacts which will contact the host device connector first in sequence, in order to provide for hot plugging of the module 10.

The base member 50 includes latch member 90 mounted thereto. The latch member 90 includes a finger engagement surface 91 and a latch member extended body 92 and an ejection tab 93. The body 92 of the latch member 90 is extended beyond what is specified in the SFP MSA (SFF-8074i) in order to allow the finger engagement surface 91 to be exposed and protrude beyond the end face 35 of the base member 50. In FIG. 3 the latch member 90 is shown in its extended position which is its position when the module is mounted within a host device. While fully mated within a cage of a host device, the latch member is pushed outwardly away from the end face 35 of the base member 50. This extended orientation allows for an operator to push on the finger engagement surface 91 in order to move the latch member 90 to a de-latched position and to disengage the module from the host device and eject it therefrom. FIG. 2 depicts the latch member 90 in the de-latched position.

Figure 4:
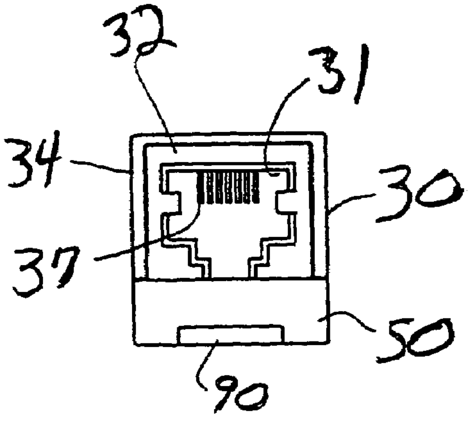
FIG. 4 is an end view of the transceiver module of FIG. 1 showing the receptacle opening.

FIG. 4 discloses the receptacle opening 31 of the peripheral device connector 30 which includes an outer connector housing 34 surrounding receptacle insulator 32. In addition, a metal shield may be provided between the connector housing 34 and receptacle insulator 32. In an embodiment, the connector housing 34 may include a bump or tab protruding from a top or side surface in order to engage the chassis of a host device in order to ground the peripheral device connector 30 thereto. The connector 30 is mounted on base member 50 which supports the connector the module 10. Contacts 37 protrude within the receptacle opening 31. In a preferred embodiment, the receptacle opening 31 is formed to receive an RJ-45 jack therein. The receptacle opening 31 at its broadest point has dimensions of approximately 0.456" and 0.37". The receptacle conforms with FCC 68.500 standard for RJ-45 jacks. However, it is to be understood that other types of receptacles and peripheral device connectors may be encompassed by the present invention.

Figure 5:
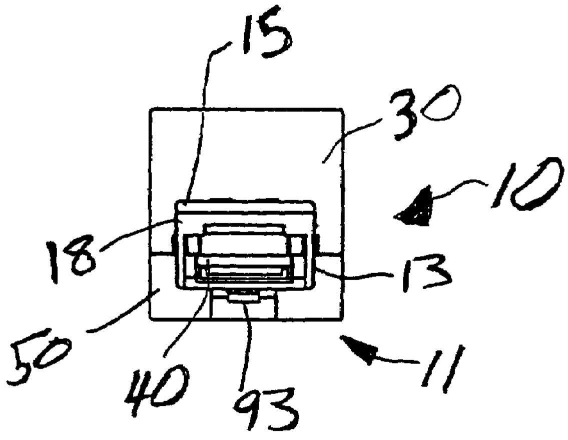
FIG. 5 is an end view of the transceiver module of FIG. 1 showing the host device connector.

FIG. 5 discloses the second end 11 of the module 10 including the cover 15 and the housing 18 which forms the main body portion 13 and surrounds the printed circuit board 40 on four sides. The printed circuit board 40 is exposed at the first end 11 and may be inserted within a receptacle of a host device (not shown). The peripheral device connector 30 is shown mounted on top of the base member 50. This view makes clear how the peripheral device connector has an outer dimension profile that is enlarged with respect to the outer dimension profile of the main body portion 13 of the module 10. The ejection lever 93 is shown protruding along the bottom of the housing 18 of the main body portion 13 of the module 10.

The matter set forth in the foregoing description and accompanying drawings is offered by way of illustration only and not as a limitation. While particular embodiments have been shown and described, it will be obvious to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A transceiver module comprising:

a main body including a first end, the main body having an outer profile; and a peripheral device connector having contacts exposed therein and forming a receptacle for receiving a peripheral device jack and the peripheral device connector having a receptacle outer profile being larger than the main body outer profile in at least one dimension and the receptacle disposed at a second end opposite the first end.

2. The transceiver module of claim 1, wherein the module includes a housing having a printed circuit board mounted within the housing and the peripheral device connector electrically connected to the printed circuit board.

3. The transceiver module of claim 1 further comprising a release member having an extended body and the release member mounted to a base of the peripheral device connector.

4. The transceiver module of claim 3, wherein the release member provides for de-latching of the transceiver module from a host device.

5. The transceiver module of claim 1, wherein the module includes a printed circuit board having an edge exposed at the first end and forming at least a portion of a host device connector.

6. The transceiver module of claim 5, wherein the host device connector is disposed at the first end and the edge of the printed circuit board provides for a male style electrical connector.

7. The transceiver module of claim 5, wherein the host device connector includes an outer housing having an outer profile that is the same as the main body outer profile.

8. The transceiver module of claim 1 further comprising a release member extending between the second end and a latching point disposed on the main body and the latching point including a latching tab.

9. The transceiver module of claim 8, wherein the latching tab is disposed on the main body and does not extend past the receptacle outer profile and a majority of the release member extends along a base of the peripheral device connector.

10. The transceiver module of claim 8, wherein the main body includes an ejection lever adjacent the latching point.

11. The transceiver module of claim 8, wherein the second end includes a slot extending between the second end and the latching point and the release member mounted in the slot and the release member including a body, the body of the release member disposed within the slot so that the release member is perpendicular to the receptacle outer profile.

12. The transceiver module of claim 1, wherein the second end forms a first overhang portion that extends beyond the first profile and provides for an abutment wall on the second end that is formed generally transverse and adjacent to the main body.

13. The transceiver module of claim 12, wherein the first overhang portion is adjacent the latching point disposed on the main body.

14. The transceiver module of claim 12 further comprising a second overhang portion formed by the second end on a side opposite the first overhang portion.

15. A transceiver module comprising:

a housing having a first end and a second end and, the housing having a first dimension defined by the first end's narrowest portion;

the second end providing at its broadest portion a second dimension being greater than the first dimension;

a host device connector provided at the first end and having a male style connector; and a peripheral device receptacle provided at the second end and having an outer profile formed by the housing that includes the second dimension.

16. The module of claim 15, wherein the narrowest portion is provided by a body extending from the first end and the body is insertable into an opening of a cage of a host device.

17. The module of claim 15 further comprising a release member disposed at the second end and the release member having a delatching end disposed beyond the portion of the housing providing the second dimension.

18. A small form factor transceiver module comprising:

a housing including a first end having a host connector and a main body attached to the first end, the first end and main body being contiguous and defining a first profile;

a second end having a second profile being larger in at least one dimension than the first profile;

a peripheral device connector disposed at the second end defining a receptacle having contacts exposed therein; and a latching point disposed on the main body between the first and second end for latching the module to a host device.

19. The module of claim 18, wherein the latching point includes a latching tab disposed on the main body adjacent the second end so that upon insertion of the module into an opening in a host device, the latching tab will be received within the opening prior to the second profile of the module abutting the opening.

20. The module of claim 18, wherein the housing provides a one-piece construction including the first end and main body and including a ground tab protruding from the housing to aid in EMI shielding of the module.

21. A small form factor transceiver module comprising:

a housing including a first end having a host connector and a main body extending therefrom and the first end and main body defining a first profile;

a second end having a second profile being larger in at least one dimension than the first profile;

a latching point disposed on the main body between the first and second end;

a peripheral device connector disposed at the second end defining a receptacle having contacts exposed therein; and an ejection tab disposed at the latching point and the ejection tab extends from the main body but does not extend past the second profile.

22. The module of claim 21 wherein the main body includes an ejection lever including the ejection tab disposed at the latching point.

23. The module of claim 21 wherein the second end includes a slot extending between the second end and the latching point and a latch member mounted in the slot so that a body of the latch member is collinear with the second profile.

24. The module of claim 21 wherein the second end forms a first overhang portion that extends beyond the first profile and provides for an abutment wall on the second end that is formed generally transverse and adjacent to the main body and ejection tab.

25. The module of claim 24 wherein the first overhang portion is adjacent the latching point disposed on the main body and the ejection tab does not extend beyond the first overhang portion.

26. The module of claim 25 further comprising a second overhang portion formed by the second end of a side opposite the first overhang portion.

27. The module of claim 21 further comprising a latch member extending between the second end and the latching point and the latch member is actuated by a finger engagement surface disposed at the second end.

28. The module of claim 21 wherein the main body includes a longitudinal axis extending between the first and second end and the ejection tab disposed at the longitudinal axis adjacent the second end.

29. The module of claim 21 wherein the host connector includes contact fingers exposed by an opening formed on a bottom side of the main body at the first end and the ejection tab disposed on the bottom side adjacent the second end.

30. The module of claim 29 wherein the second end forms a first overhang portion that extends beyond the first profile and provides for an abutment wall on the second end that is formed generally transverse and adjacent to the main body and ejection tab.

* * * * *